Jan. 21, 1941.  E. L. FISCHER  2,229,283
WINDING DEVICE
Filed March 18, 1939   2 Sheets-Sheet 1
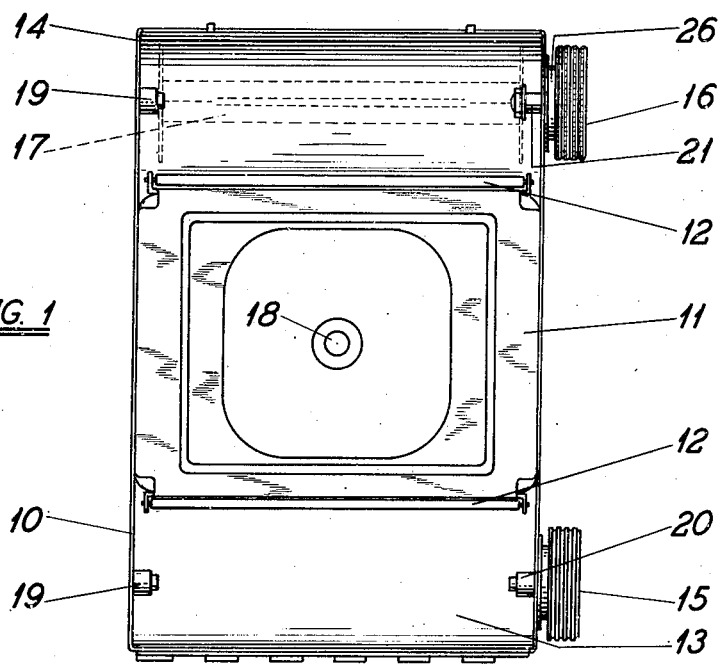
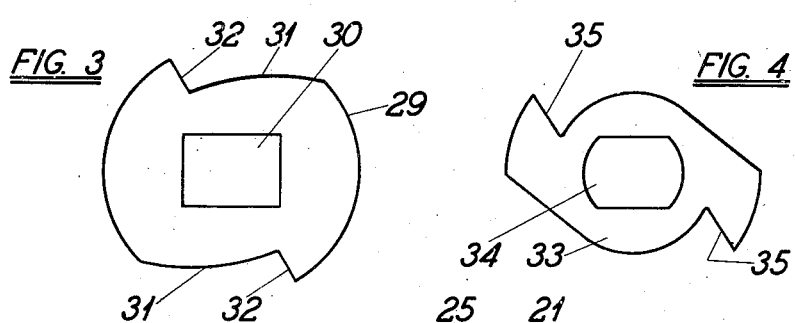
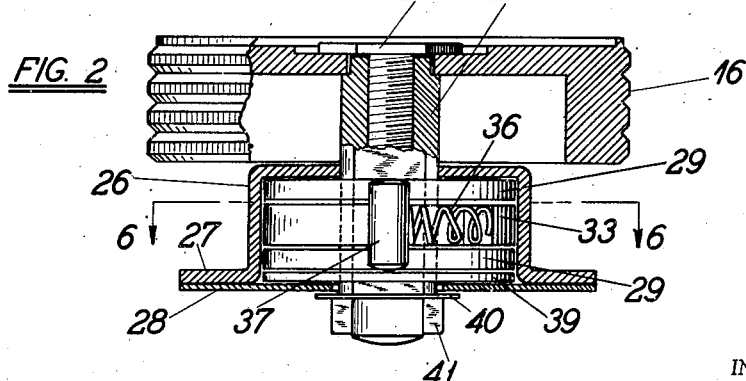
INVENTOR.
EDWIN L. FISCHER
BY
ATTORNEY.

Jan. 21, 1941.　　　　E. L. FISCHER　　　　2,229,283
WINDING DEVICE
Filed March 18, 1939　　　2 Sheets-Sheet 2
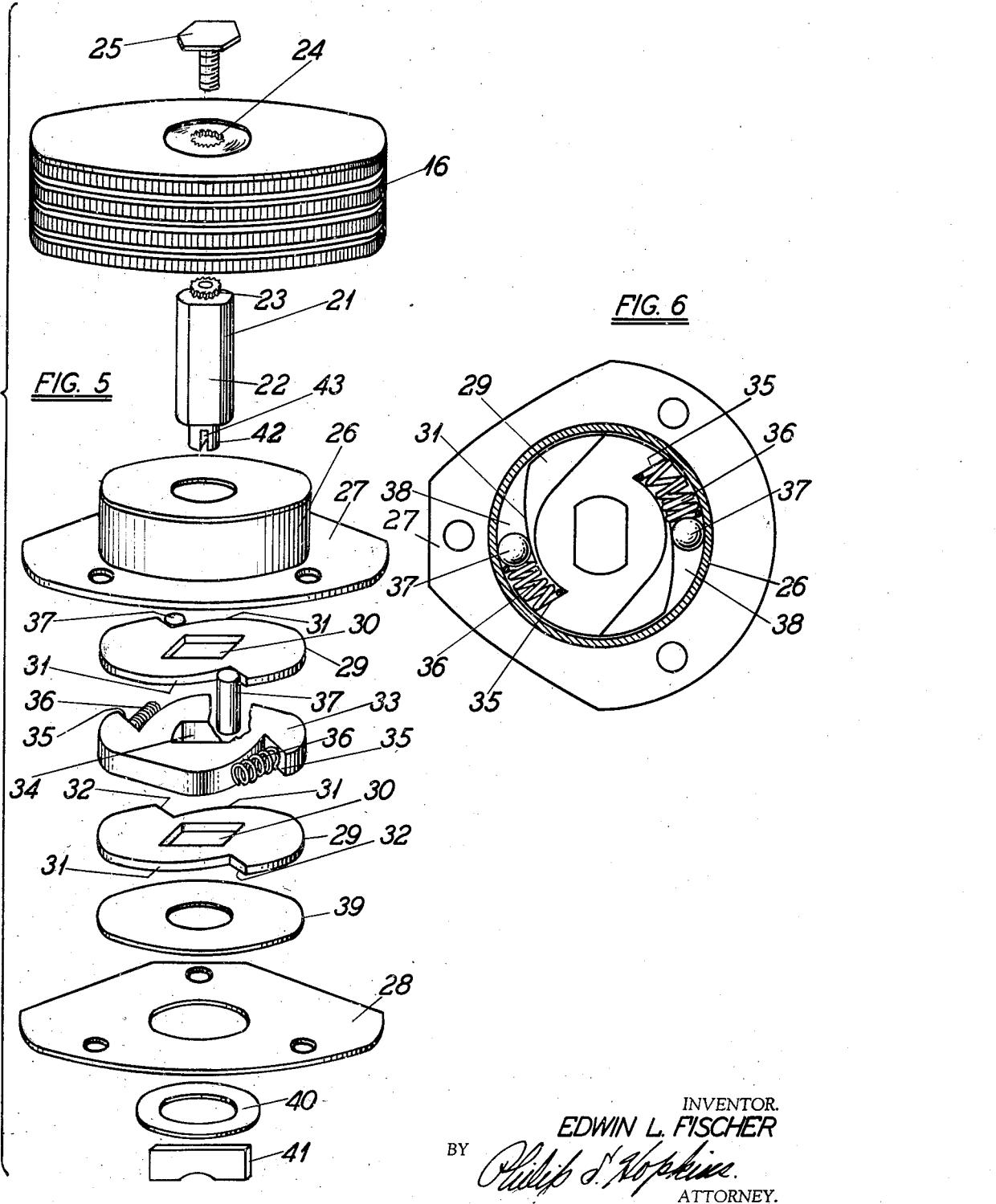

Patented Jan. 21, 1941

2,229,283

UNITED STATES PATENT OFFICE 2,229,283

WINDING DEVICE

Edwin L. Fischer, Endwell, N. Y., assignor, by mesne assignments, to General Aniline & Film Corporation, New York, N. Y., a corporation of Delaware Application March 18, 1939, Serial No. 262,752

6 Claims. (Cl. 242—71)

My invention relates to a winding device for cameras and the like which is rotatable in only one direction. In ordinary roll film cameras it is customary to provide one or more winding knobs which are adapted to engage with the film spools in order to roll the film from a supply spool to a takeup spool. Earlier forms of devices to permit winding in only one direction comprised a pawl and ratchet or similar mechanism. Such devices were not only difficult and expensive to incorporate within the available space on the camera body, but their action was directed solely on the shaft or spindle itself, and thus only slight leverage against backward motion was obtained. Also, in any ratchet device there is a small region within which backward motion is possible before the next ratchet is engaged. Furthermore, in many such earlier devices it was difficult to move the knob directly in and out of engagement with the film spool without turning the knob slightly by reason of the tight frictional engagement of the parts.

With these defects and disadvantages of the prior art in view, one object of my invention is to provide a winding key which can be rotated in only one direction. A further object is to provide such a key in a compact form which will be economical to construct. Still another object is to develop a key whose locking action shall take place against the housing itself rather than the spindle, in order to obtain greater locking leverage. A still further object is to provide such a device which will be positive in its action and not susceptible to forcible backward rotation. Another object is to provide a device which will be frictionally restrained from loose axial movement, but which can nevertheless be axially moved when moderate force is applied, without the necessity of turning the device to permit such movement. Further objects and advantages will appear from the following specification.

My invention accordingly comprises the construction and arrangement, a preferred form of which is shown in the accompanying drawings forming a part of this application, wherein Fig. 1 is a partial rear view of a camera embodying my device; Fig. 2 is a sectional view of one form of my invention taken in a plane through the axis of the device; Figs. 3 and 4 are views of particular parts showing details of construction thereof; Fig. 5 is an exploded view (in brackets) of the device shown in Fig. 2; and Fig. 6 is a sectional view on the line 6—6 of Fig. 2.

In order that those skilled in the art may fully comprehend the nature and scope of my invention the following detailed and concise description is given, with particular reference to the accompanying drawings, wherein like reference characters indicate like parts.

In Fig. 1 the camera body 10 is provided with a suitable lens 18 and the customary film holding chambers 13 and 14. The supply of film may be contained on a spool (not shown) mounted in the chamber 13 between the fixed bearing 19 and the axially movable bearing 20 attached to the knob 15. From this supply chamber the film may be led over the focal plane supporting surface 11 (which is provided with suitable rollers 12) and may then be wound on a takeup spool 17 (shown in dotted outline only) which in turn is mounted in the chamber 14 between the fixed bearing 19 and the axially movable winding spindle 21 connected to the winding knob 16. The device embodying my invention which prevents the backward movement of this winding knob 16 is contained within the housing 26 over which the knob 16 fits. Thus a very compact form of construction is obtained.

With reference to Figs. 2 and 5, the knob 16 is connected to a suitable spindle 21 by means of, for example, cooperating toothed portions 23 and 24 and a locking screw 25. The spindle 21 is preferably flattened on opposite sides as at 22, or is otherwise formed with a non-circular cross section. The spindle is further provided with a somewhat narrowed portion at its lower end 42, which portion may have a slot 43 into which a key 41 may later be suitably secured to lock the assembly together. This spindle 21 is adapted to be mounted within the housing 26, which in turn is provided with a flange 27 against which the plate 28 is sealed in the final assembly. Within the cylindrical housing 26 and mounted on the spindle 21 may be one or more locking plates 29 (see Fig. 3). These locking plates 29 are provided with non-circular openings 30 adapted to receive the flattened spindle 21, and avoid substantial relative rotary motion between these two parts. These locking plates are preferably further provided with circumferentially tapered clutch surfaces 31. In the space 38 between these clutch surfaces 31 and the interior wall of the housing 26 are mounted one or more clutch rollers 37 (see Fig. 6). As will be seen from the description and drawings, the clutch surfaces 31 and the interior wall of the housing are at a varying distance from each other such that the rollers 37 may rest loosely between the two where they are most broadly separated as, for example, when the winding knob spindle and locking plates are turned in a clockwise direction. In such a case the rollers will tend to remain in the broader portion of this space 38 and will be carried along by the shoulders 32 on the locking plates 29. On the other hand, when a counter-clockwise movement is attempted these clutch rollers 37 will be caught in the narrower portion of the space 38 and will therefore cause the locking plate, spindle and knob to bind against the housing and remain stationary in relation thereto.

In order to assist the locking action of this device I have found it advisable to incorporate spring means 36 which tend to force the clutch rollers 37 toward the narrow portion of the space 38 and carry the rollers along during clockwise rotation without the help of the shoulders 32 on the locking plates 29. These spring means 36 are conveniently held by means of a spring plate 33 mounted on the spindle between the two locking plates 29. This spring plate 33 (see Fig. 4) is provided with the irregular opening 34 adapted to receive the spindle 21 and prevent substantial relative rotary motion between the plate and spindle. The plate is further provided with one or more projecting shoulders 35 against which is held one end of the spring means 36. The other end of this spring acts against the clutch rollers 37. The presence of a locking plate on each side of the spring plate serves to form a circumferential channel in which the spring means is compactly mounted without danger of twisting out of place. Furthermore it will be seen that the clutch rollers themselves are firmly held against twisting by reason of the pressure of the two locking plate clutch surfaces in one direction at the ends of the rollers, and the opposing action of the spring means at the center of the rollers. This three point support for the clutch rollers is extremely stable and compact. These spring means 36 are not strong enough to bind the rollers 37 into the narrow portions of the space 38 when the knob is turned in a clockwise direction, but they are of sufficient tension to insure that the rollers will be in a position to lock the device the instant a counter-clockwise movement is attempted.

A sealing washer 39 may be mounted on the spindle 21 to maintain the various parts of the assembly inside the housing 26. This washer in turn is held in place by the plate 28 cooperating with the flange 27 on the housing. On the projecting narrowed end 42 of the spindle 21 may be placed another washer 40 held in place by the key 41, fastened within the slot 43. It should be noted that the spindle 21 is somewhat longer than absolutely necessary merely to pass through the housing. Thus the knob and spindle are axially movable for the purpose of engaging with or disengaging from the film takeup spool 17.

In addition to the prompt locking action, the combination of spring, plates, and rollers has a further important and novel function. The spring action between the shoulder 35 on the spring plate 33 and the rollers themselves, which in turn push against the clutch surfaces 31 on the locking plates 29, will tend to rotate this spring plate 33 in a counter-clockwise direction with respect to the locking plates 29. Substantial relative rotation is prevented, of course, by the irregular shape of the spindle and correspondingly shaped openings in the plates. Nevertheless, the spring plate and locking plates will tend to rotate oppositely to each other and will thus grip or engage the spindle 21 with a certain amount of friction. Since the spring plates and locking plates substantially fill the housing 26 and thus cannot move axially with respect thereto, the frictional engagement between said plates and the spindle will prevent the spindle from moving loosely in an axial direction. At the same time the friction caused in this way is not great enough to prevent such axial movement when reasonable force is applied, as by the fingers. And such axial movement is possible without advancing the winding knob, since the frictional engagement between the plates and spindle is substantially independent of the locking action of the clutch rollers and plates against the housing.

Since equivalent forms of construction comprising a clutch roller acting between a clutch surface and a portion of the housing are included within the scope of my invention, it will be understood that my invention is not limited to the precise construction shown, but is limited only by the scope of the accompanying claims.

I claim:

1. A non-slip winding device comprising a housing, a spindle mounted therein, a locking plate mounted on said spindle and in substantially fixed rotational relation thereto and having a clutch surface thereon tapered with respect to said housing, a clutch roller mounted between said clutch surface and said housing, whereby rotation of the spindle in one direction with respect to the housing is prevented by the frictional engagement of said clutch roller between said clutch surface and housing, a spring plate also mounted on said spindle and in substantially fixed rotational relation thereto, and spring means tending to rotate said locking plate and spring plate in opposite relative directions whereby said plates frictionally grip said spindle and prevent loose axial movement of said spindle.

2. A non-slip winding device comprising a cylindrical housing, a spindle mounted axially therein, a locking plate concentrically mounted on said spindle and in substantially fixed rotational relation thereto and having a clutch surface thereon circumferentially tapered with respect to said housing, a clutch roller mounted between said clutch surface and said housing, whereby rotation of the spindle and locking plate in one direction with respect to the housing is prevented by the frictional engagement of said clutch roller between said clutch surface and housing, a spring plate also mounted on said spindle and in substantially fixed rotational relation thereto, and spring means tending to rotate said locking plate and spring plate in opposite relative directions whereby said plates frictionally grip said spindle and prevent loose axial movement of said spindle.

3. A non-slip winding device comprising a cylindrical housing, a spindle mounted axially therein, a locking plate concentrically mounted on said spindle and in substantially fixed rotational relation thereto and having a clutch surface thereon circumferentially tapered with respect to said housing whereby a wedge-like space is formed between said clutch surface and housing, a clutch roller mounted in said space between said clutch surface and said housing, spring means normally tending to hold said clutch roller in the narrowed portion of said wedge-like space, whereby rotation of the spindle and locking plate in one direction with respect to the housing is prevented by the frictional engagement of said clutch roller between said clutch surface and housing, and a spring plate also mounted on said spindle and in substantially fixed rotational relation thereto, said spring plate being engaged by said spring means, whereby said spring plate and said locking plate tend to rotate in opposite relative directions and thereby frictionally grip said spindle and prevent loose axial movement of said spindle.

4. A non-slip winding device comprising a cylindrical housing, a spindle mounted axially therein, two locking plates each mounted concentrically on said spindle and in substantially fixed rotational relation thereto and having clutch surfaces thereon circumferentially tapered with respect to said housing, clutch rollers mounted between said clutch surfaces and said housing, and a spring plate axially mounted on said spindle between said locking plates and in substantially fixed rotational relation thereto, said spring plate having shoulders thereon, and spring means mounted between said spring plate shoulders and said clutch rollers and adapted to hold said clutch rollers in simultaneous contact with said housing and said clutch surfaces, whereby rotation of the spindle, locking plates and spring plate in one direction with respect to said housing is prevented by the frictional engagement of said clutch rollers between said clutch surfaces and housing.

5. A non-slip winding device comprising a cylindrical housing, a spindle mounted axially therein, two locking plates each mounted concentrically on said spindle and in substantially fixed rotational relation thereto and having clutch surfaces thereon circumferentially tapered with respect to said housing, clutch rollers of a length greater than the axial separation of said locking plates mounted parallel to the axis of the housing and between said clutch surfaces and said housing, and a spring plate axially mounted on said spindle between said locking plates and in substantially fixed rotational relation thereto, said spring plate having shoulders thereon, and spring means mounted between said spring plate shoulders and said clutch rollers and adapted to hold said clutch rollers in simultaneous contact with said housing and the clutch surfaces of said two locking plates, whereby rotation of the spindle, locking plates and spring plate in one direction with respect to said housing is prevented by the frictional engagement of said clutch rollers between said clutch surfaces and housing, said spring means further tending to rotate said spring plate and said locking plates in opposite relative directions, whereby said plates frictionally grip said spindle and prevent loose axial movement of said spindle, independently of the locking action of said clutch rollers against said housing.

6. A non-slip winding device comprising a cylindrical housing, a spindle mounted axially therein, two locking plates each mounted concentrically on said spindle and in substantially fixed rotational relation thereto and having tapered clutch surfaces thereon, clutch rollers mounted between said clutch surfaces and said housing, a spring plate axially mounted on said spindle between said locking plates and in substantially fixed rotational relation thereto and having shoulders thereon, and spring means mounted between said spring plate shoulders and said clutch rollers for holding said rollers against said housing and clutch surfaces and preventing rotation of said spindle in one direction, said spring plate having a portion adjacent said spring of smaller diameter than the corresponding portions of said locking plates whereby a circumferential channel is formed in which said spring means is retained without danger of accidental twisting and dislocation.

EDWIN L. FISCHER.